United States Patent [19]

Evans et al.

[11] Patent Number: 4,920,183

[45] Date of Patent: Apr. 24, 1990

[54] METHOD FOR MAKING SILICONE-POLY(ARYLCARBONATE) BLOCK COPOLYMERS

[75] Inventors: Thomas L. Evans, Clifton Park; John C. Carpenter, Schenectady, both of N.Y.

[73] Assignee: General Electric Company, Schenectady, N.Y.

[21] Appl. No.: 307,707

[22] Filed: Feb. 8, 1989

Related U.S. Application Data

[63] Continuation-in-part of Ser. No. 158,411, Feb. 22, 1988.

[51] Int. Cl.$^5$ .............................................. C08F 283/02
[52] U.S. Cl. .................................... 525/464; 525/474; 528/25; 528/26
[58] Field of Search ............... 525/464, 474; 528/25, 528/26

[56] References Cited

U.S. PATENT DOCUMENTS 3,189,662  6/1965  Vaughn, Jr. .................. 525/474
3,819,744  6/1974  Buchner et al. ............... 525/464
3,861,915  1/1975  Cawley ....................... 525/474

*Primary Examiner*—Melvyn I. Marquis
*Attorney, Agent, or Firm*—William A. Teoli; James C. Davis, Jr.; William H. Pittman

[57] ABSTRACT

A method for making silicone-poly(arylcarbonate) block copolymers is provided by intercondensing a hydroxyl-terminated polycarbonate oligomer with a halo-terminated polydiorganosiloxane in the presence of an acid acceptor.

9 Claims, No Drawings

METHOD FOR MAKING SILICONE-POLY(ARYLCARBONATE) BLOCK COPOLYMERS

REFERENCE TO RELATED APPLICATION

This application is a continuation-in-part of application Ser. No. 158,411, filed Feb. 22, 1988.

Reference is made to copending application Ser. No. (158,450) filed Feb. 22, 1988 of Thomas L. Evans et al., filed concurrently herewith now U.S. Pat. No. 4,849,502.

BACKGROUND OF THE INVENTION

The present invention relates to a method for making silicone-poly(arylcarbonate) block copolymers by effecting reaction between a polyarylcarbonate oligomer having terminal hydroxylaryl groups and a polydiorganosiloxane having terminal chlorodiorganosiloxy groups in the presence of an organic solvent and an acid acceptor.

Prior to the present invention, as shown by Vaughn, U.S. Pat. No. 3,189,662, assigned to the same assignee as the present invention and incorporated herein by reference, silicone-polycarbonate block copolymers were made by phosgenating a mixture of dihydric phenol terminated polydiorganosiloxane, and dihydric phenol in the presence of an organic solvent and an acid acceptor. Although Vaughn's method results in the production of silicone-polycarbonate block copolymers useful in a variety of applications, such as injection moldable thermoplastics and elastomers having improved tensile properties, the method requires the use of phosgene gas. As a result, industry is constantly seeking new procedures for producing silicone-poly(arylcarbonate) block copolymers.

The present invention is based on the discovery that silicone-poly(arylcarbonate) block copolymers can be made without directly using phosgene gas in the final synthesis of the block copolymer by using a hydroxyl-terminated polyarylcarbonate oligomer having an average of about 2 to 1000 chemically combined arylcarbonate units. The hydroxylaryl terminated polyarylcarbonate oligomer, or "hydroxyaryl oligomer" is, thereafter, intercondensed with a chlorine terminated polydiorganosiloxane using an acid acceptor and an organic solvent.

STATEMENT OF THE INVENTION

There is provided by the present invention a method for making silicone-poly(arylcarbonate) block copolymers which comprises (1) providing a hydroxylaryl terminated polyarylcarbonate oligomer having an average of about 2 to about 1000 chemically combined arylcarbonate units, (2) intercondensing the hydroxylaryl terminated polycarbonate oligomer and a chlorine terminated polydiorganosiloxane having an average of about 2 to about 1000 chemically combined diorganosiloxy unit in the presence of an organic solvent and an acid acceptor, and (3) recovering silicone-poly(arylcarbonate) block copolymer from the mixture of (2).

Hydroxylaryl oligomers can be made by effecting the polymerization of cyclic aryl carbonates in the presence of phenol or bisphenol-A as shown in copending application of Ser. No. 158,450, filed Feb. 22, 1988, filed concurrently herewith now Patent No. 4,849,502. Another procedure which can be used to make the hydroxylaryl oligomer is by the controlled degradation of high molecular weight polycarbonate resin having an intrinsic viscosity in chloroform of from 0.1 to 4 dl/gm at 25° C. with a phenol or polyhydric phenol, and polymerization initiator, such as an alkali metal phenoxide or polycarbonate formation catalysts, disclosed by Brunelle et al., U.S. Pat. No. 4,644,053, incorporated herein by reference.

Chlorine terminated polydiorganosiloxane can be made by conventional procedures, such as by the controlled hydrolysis of diorganodihalosilane, for example, dimethyldichlorosilane as taught in U.S. Pat. No. 2,381,366 (Patnode) or U.S. Pat. No. 2,629,726 (Hyde). Another procedure which can be employed to make chlorine terminated polydiorganosiloxane is the equilibration of a mixture of diorganodichlorosilane and a cyclic polydiorganosiloxane, for example, octamethylcyclotetrasiloxane in the presence of a metal catalyst as ferric chloride as shown in U.S. Pat. No. 2,421,653 (Sauer).

Intercondensation of the hydroxylaryl oligomer and the chlorine terminated polydiorganosiloxane can be effected by agitating or stirring in the presence of an inert organic solvent and an acid acceptor, such as a tertiaryorganoamine. The order of addition of the reactants is not critical. Suitable organic solvents are, for example, methylene chloride, chlorobenzene, tetrahydrofuran, and N,N'-dimethylformamide.

Among the acid acceptors which have been found effective are, for example, triethylamine and pyridine.

Intercondensation temperatures which can be used are, preferably, −10° C. to 35° C. Higher temperatures can be used in instances where higher boiling solvents are employed.

Recovery of the silicone-polycarbonate block polymer can be effected by addition of the reaction mixture to a precipitating solvent such as methanol.

The silicone-polycarbonate block copolymer made by the method of the invention can be used as a laminating agent for polycarbonate, membranes, in adhesive formulations, and coatings for appliances.

In order that those skilled in the art will be better able to practice the invention, the following examples are given by way of illustration and not by way of limitation. All parts are by weight.

EXAMPLE 1

There was stirred at room temperature under nitrogen atmosphere for 16 hours a mixture of 300 grams (1.18 moles) of cyclic polycarbonate oligomer of bisphenol-A having an average degree of polymerization of about 4, 72 grams (0.34 mole of bisphenol-A), 7.5 ml of a 0.10 molar solution in THF of sodium phenoxide, 1.5 liters of methylenechloride and 50 ml of dimethylsulfoxide. The reaction mixture was continuously stirred at room temperature. Based on method of preparation and an HPLC trace, there was obtained after reprecipitation and isolation from hexane, hydroxyl terminated polycarbonate oligomer having 3.147 weight percent hydroxyl end groups. These oligomers had an average block size of about 4-5 chemically combined carbonate units.

There was added 10-20 g of a chlorosilane terminated polydimethylsiloxane fluid having an average of about 8.2 dimethylsiloxy units in a drop-wise manner over a three hour period with stirring to 10.2 grams of hydroxyl terminated oligomer, 2.36 grams of triethylamine and 50 ml of methylene chloride. The reaction mixture was allowed to stir for an additional two hours. Product was obtained by adding methanol containing a small quantity of sulfuric acid to the reaction mixture. Based on method of preparation and $^1$H NMR, there was obtained a silicone-poly(bisphenol-A-carbonate) block copolymer having an average molecular weight of 36,469 and 42 weight percent of silicone. The block copolymer had a $T_g$ of 111° C. as determined by DSC. A film molded from the block copolymer at 240° C. was found to be clear.

EXAMPLE 2

A hydroxyl bisphenol-A terminated polycarbonate was prepared by stirring a mixture of 30 grams (0.118 moles) of LEXAN® polycarbonate resin having an intrinsic viscosity in chloroform of 0.5 dl/g at 25° C. 7.2 grams (0.034 mole) of bisphenol-A, 0.375 ml of a 0.10 mole solution of sodium phenoxide in THF, 350 ml of methylene chloride, and 20 ml of dimethylsulfoxide (DMSO). The mixture was allowed to react at room temperature under a nitrogen atmosphere for 16 hours. Based on method of preparation and an HPLC trace, there was obtained bisphenol-A terminated polycarbonate oligomer having an average of 4–5 chemically combined carbonate units. The mixture was then washed five times with deionized water to remove the DMSO; the methylenechloride was removed by a rotary evaporator. The resulting product was dried for about 12 hours at 110° C. in a nitrogen purge vacuum oven.

There was slowly added over a three-hour period, 6.9 grams of a chlorine chain-stopped dimethylsiloxane fluid to a mixture of 10 grams of the above hydroxyl aryl terminated polycarbonate oligomer and 1.81 grams of triethylamine. A product was isolated after three hours of additional reaction by precipitating the product into methanol. Based on method of preparation and $^1$H NMR, the product was a silicone-poly(bisphenol-A-carbonate) block copolymer having a weight average molecular weight of 50,995 and a polydispersity of 1.82. The block copolymer had a silicone content of 34% by weight based on NMR analysis and a $T_g$. A glass transition temperature of 96° C. was determined by DSC. A film molded from the block copolymer at 240° C. was found to be clear.

EXAMPLE 3

There was added to a Helicone vertical mixer, which was preheated to 255° C., a mixture of 45 grams (0.18 mole) of cyclic carbonate consisting of an average of 3 to 4 chemically combined bisphenol-A carbonate units, 10.8 grams (0.05 mole) of bisphenol-A, and 99 milligrams (0.176 millimoles) of tetrabutylammonium tetraphenylborate. The mixture was allowed to stir under nitrogen for 20 minutes. Based on method of preparation and HPLC analysis, the product was a linear polycarbonate oligomer having an average of about 4–5 chemically combined bisphenol-A carbonate units terminated with bisphenol-A units.

A mixture of 10 grams of the above polycarbonate oligomer, 6.9 grams of a chlorine chain-stopped polydimethylsiloxane having an average of about 10 chemically-combined dimethylsiloxy units, 30 ml of methylenechloride, and 1.81 grams of triethylamine was stirred for 3 hours under ambient conditions. The mixture was then poured into methanol to effect the precipitation of product. Based on method of preparation, the product was a silicone polycarbonate copolymer having a weight average molecular weight of 48,000.

The above procedure was repeated except that the polycarbonate oligomer was made by adding a mixture of 45 grams (0.18 mole) of polycarbonate resin having an intrinsic viscosity of about 0.5 dl/g in chloroform at 25° C., 10.8 grams (0.05 mole) of bisphenol-A, and 99 milligrams (0.176 milimoles) of tetrabutylammonium tetraphenylborate which was agitated in a Helicone vertical mixer for 20 minutes at 255° C. There was obtained a polycarbonate oligomer having an average of about 4–5 chemically-combined carbonate units based on method of preparation and HPLC analysis. A silicone polycarbonate block copolymer was prepared in accordance with the above procedure having a weight average molecular weight of about 42,000.

EXAMPLE 4

A mixture of 1.296 grams of bisphenol-A, 4.5 grams of bisphenol-A polycarbonate having an intrinsic viscosity of about 0.5 dl/g chloroform at 25° C., 1.21 gram of triethylamine and 100 ml of methylene chloride was refluxed with stirring for 2.5 hours. Half of the methylene chloride volume was then removed by distillation and the reaction mixture was cooled to room temperature. There were added to the mixture, an additional 1.21 gram of triethylamine, 4.5 grams of a chlorine terminated polydimethyl siloxane fluid having an average of about 10 chemically combined dimethylsiloxy units which was added drop-wise with rapid stirring over the course of one hour. The reaction mixture was allowed to stir for an additional hour. It was then washed successively two times with 25 ml of aqueous 0.1N HCl and three times with 25 mL of water. The mixture was poured into methanol and a product was isolated. Based on method of preparation, the product was a polycarbonate silicone block copolymer. The product was found to have a weight average molecular weight of 90,000 and 42% by weight of silicone. It yielded a clear film on compression molding.

Although the above examples are directed to only a few of the very many variables which can be used in the practice of the present invention, it should be understood that the present invention is directed to a much broader variety of silicone polycarbonate block copolymers. There can be used, for example, dihydric phenols in place of bisphenol-A such as hydroquinone and bis(4-hydroxyphenyl)-sulfone. Other dihydric phenols which can be used are shown by Vaughn, U.S. Pat. No. 3,189,662.

In addition, other polydiorganosiloxanes can be used which can be obtained by hydrolyzing or cohydrolyzing diorgano-halosilanes other than dimethyldichlorosilane such as, diphenyl dichlorosilane, methylvinyl dichlorosilane methylphenyl dichlorosilane, and mixtures thereof. Additional cyclic siloxanes, such as cyclics having 3 to 8 chemically combined dimethylsiloxy units, methylvinylsiloxy units, diphenylsiloxy units, methylhydrogensiloxy units and mixtures thereof, which can be equilibrated, also can be used.

What is claimed is:
1. A method for making silicone-poly(arylcarbonate) block copolymers which comprises
   (1) polymerizing a cyclic aryl carbonate in the presence of a phenol or bisphenol-A- to provide a hydroxylaryl terminated polyarylcarbonate oligomer having an average of about 2 to 1000 chemically combined arylcarbonate units,

(2) intercondensing the hydroxylaryl terminated polycarbonate oligomer and chlorine terminated polydiorganosiloxane having an average of about 2 to 1000 chemically combined units in the presence of an organic solvent and an acid acceptor, and (3) recovering silicone-poly(arylcarbonate) block copolymer from the mixture of (2).

2. A method in accordance with claim 1, where the hydroxylaryl-terminated polyarylcarbonate oligomer consists essentially of chemically-combined bisphenol-A carbonate units and has terminal bisphenol-A units.

3. A method in accordance with claim 1, where the chlorine-terminated polydiorganosiloxane is a chlorine-terminated polydimethylsiloxane.

4. A method in accordance with claim 1, where the depolymerization is effected under substantially anhydrous conditions in the presence of an organic solvent.

5. A method in accordance with claim 1, which is effected in the presence of a tertiary organic amine.

6. Method for making silicone-poly(arylcarbonate) block copolymers which comprises (1) controlling the degradation of high molecular weight polycarbonate resin having an intrinsic viscosity in chloroform from 0.1 to 4 dl/gm at 25° C. with a phenol or polyhydric phenol and a polymerization initiator to provide a hydroxyaryl terminated polyarylcarbonate oligomer having an average of about 2 to 1000 chemically combined aryl carbonate units, (2) intercondensing the hydroxy aryl-terminated polycarbonate oligomer and chlorine-terminated polydiorganosiloxane having an average of about 2 to 1000 chemically combined units in the presence of an organic solvent and an acid acceptor and, (3) recovering silicone-poly(arylcarbonate) block copolymer from the mixture of (2).

7. A method in accordance with claim 6, where the depolymerization is effected under substantially anhydrous conditions in the presence of an organic solvent.

8. A method in accordance with claim 6, which is effected in the presence of a tertiary organic amine.

9. A method of making polydimethylsiloxane poly(-bisphenol-A-)carbonate block copolymers which comprises, (1) intercondensing a hydroxyl terminated bisphenol-A polycarbonate with a chlorine terminated polydimethyl siloxane in the presence of methylene chloride and triethylamine, and (2) recovering a polydimethylsiloxane poly(bisphenol-A-carbonate) block copolymer from (1), where the hydroxyl terminated bisphenol-A polycarbonate of (1) has an average of from about 2 to 1000 chemically combined bisphenol-A carbonate units and is formed by polymerizing a cyclic bisphenol-A polycarbonate in the presence of phenol or bisphenol-A.

* * * * *